United States Patent
Li et al.

(10) Patent No.: US 12,124,528 B2
(45) Date of Patent: Oct. 22, 2024

(54) IMAGE PROCESSING METHOD AND APPARATUS, AND COMPUTER READABLE STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Linsen Li, Beijing (CN); Wenwen Ye, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 18/043,169

(22) PCT Filed: Mar. 29, 2021

(86) PCT No.: PCT/CN2021/083678
§ 371 (c)(1),
(2) Date: Feb. 27, 2023

(87) PCT Pub. No.: WO2022/048141
PCT Pub. Date: Mar. 10, 2022

(65) Prior Publication Data
US 2023/0334113 A1 Oct. 19, 2023

(30) Foreign Application Priority Data
Sep. 1, 2020 (CN) .......................... 202010902786.1

(51) Int. Cl.
*G06F 16/958* (2019.01)
*G06F 3/04845* (2022.01)
*G06F 9/451* (2018.01)

(52) U.S. Cl.
CPC ........ *G06F 16/958* (2019.01); *G06F 3/04845* (2013.01); *G06F 9/451* (2018.02)

(58) Field of Classification Search
CPC .... G06F 16/148; G06F 16/16; G06F 16/9541; G06F 16/9562; G06F 16/9566;
(Continued)

(56) References Cited

U.S. PATENT DOCUMENTS 11,341,205 B1 * 5/2022 Mahedy ................ G06F 3/0481
2002/0032677 A1 * 3/2002 Morgenthaler ....... G06F 16/538
(Continued)

FOREIGN PATENT DOCUMENTS

CN 102902703 A 1/2013
CN 104462125 A 3/2015
(Continued)

OTHER PUBLICATIONS

Supplementary European Search Report in the European application No. 21863212.3, mailed on Nov. 10, 2023, 8 pages.
(Continued)

*Primary Examiner* — Robert W Beausoliel, Jr.
*Assistant Examiner* — Cheryl M Shechtman
(74) *Attorney, Agent, or Firm* — Cooper Legal Group, LLC

(57) ABSTRACT

Embodiments of the present disclosure disclose an image processing method and apparatus, and a computer readable storage medium. The method includes: obtaining at least one page image of a current full-screen page in a webpage application; converting the at least one page image into at least one file object, and creating at least one link path of the
(Continued)

at least one file object, each of the at least one file object corresponding to the respective at least one link path; and creating at least one picture object, and associatively saving the at least one picture object and the at least one link path in webpage application cache to complete taking a screenshot of the current full-screen page. Through the embodiments of the present disclosure, the screenshot capturing performance of the webpage application can be improved.

18 Claims, 10 Drawing Sheets

(58) Field of Classification Search
CPC ............ G06F 16/9574; G06F 16/9577; G06F 16/958; G06F 3/04845; G06F 9/451
See application file for complete search history.

(56) References Cited

U.S. PATENT DOCUMENTS

| | | | |
|---|---|---|---|
| 2006/0265417 A1* | 11/2006 | Amato | G06F 16/951 |
| | | | 707/999.102 |
| 2012/0311419 A1 | 12/2012 | Kwak | |
| 2014/0074942 A1* | 3/2014 | Bhogal | G06Q 10/10 |
| | | | 709/206 |
| 2014/0344658 A1* | 11/2014 | Srinivasan | G06F 40/279 |
| | | | 715/205 |
| 2017/0277625 A1* | 9/2017 | Shtuchkin | G06F 11/3688 |
| 2017/0316465 A1* | 11/2017 | Titus | G06Q 30/0276 |
| 2018/0218526 A1* | 8/2018 | Hayakawa | G06T 11/60 |
| 2021/0294838 A1* | 9/2021 | Pearlman | G06F 16/5866 |

FOREIGN PATENT DOCUMENTS

| | | |
|---|---|---|
| CN | 107766359 A | 3/2018 |
| CN | 108604234 A | 9/2018 |
| CN | 110647703 A | 1/2020 |
| CN | 111159594 A | 5/2020 |
| CN | 111399732 A | 7/2020 |
| CN | 112256990 A | 1/2021 |
| JP | 2011048704 A | 3/2011 |
| WO | 2017206739 A1 | 12/2017 |

OTHER PUBLICATIONS

International Search Report in the international application No. PCT/CN2021/083678, mailed on Jul. 2, 2021. 2 pages.
English translation of the Written Opinion of the International Search Authority in the international application No. PCT/CN2021/083678, mailed on Jul. 2, 2021. 5 pages.

* cited by examiner

IMAGE PROCESSING METHOD AND APPARATUS, AND COMPUTER READABLE STORAGE MEDIUM

CROSS-REFERENCE TO RELATED APPLICATIONS

The application is based on and claims priority to Chinese Patent Application No. 202010902786.1 filed on Sep. 1, 2020, the entire contents of which are incorporated herein by reference in its entirety.

TECHNICAL FIELD

The disclosure relates to the technical field of terminals, and in particular to an image processing method and apparatus, and a computer-readable storage medium.

BACKGROUND

At present, a user may browse contents on the whole Hyper Text Markup Language (HTML) webpage by using browser on a mobile terminal. In order to take and save screenshot of one or more screen pages in the whole webpage, a current method for taking screenshot usually takes screenshot of a specified page by the canvas method in HTML specification, then converts the taken HTML page into a picture with base64 encoding format in the browser cache, and finally saves the converted picture in the mobile terminal locally. However, the picture with base64 encoding format may occupy a large cache space, and a rendering method for webpage drawing is required to convert the HTML page to the base64 picture, and the more complex the page is, the longer the rendering time is. Therefore, the current method for taking screenshot consumes massive browser cache and has a long-time process for taking screenshot, which reduces performance of the browser cache.

SUMMARY

Embodiments of the disclosure are expected to provide an image processing method and apparatus, and a computer-readable storage medium, which may improve screenshot performance of a webpage application.

Technical solutions of the disclosure are implemented as follows.

In a first aspect, an embodiment of the disclosure provides an image processing method, including the following operations.

At least one page image of a current full-screen page is obtained in a webpage application.

The at least one page image is converted into at least one file object, and at least one link path of the at least one file object is created, the at least one file object corresponds to the at least one link path one-to-one.

At least one picture object is created, and the at least one picture object and the at least one link path are associatively saved in a cache of the webpage application, to complete screenshot of the current full-screen page.

In a second aspect, an embodiment of the disclosure provides an image processing apparatus, including an acquisition part, a conversion part and a saving part.

The acquisition part is configured to obtain at least one page image of a current full-screen page in a webpage application.

The conversion part is configured to convert the at least one page image into at least one file object and create at least one link path of the at least one file object, the at least one file object corresponds to the at least one link path one-to-one.

The saving part is configured to create at least one picture object, and associatively save the at least one picture object and the at least one link path in a cache of the webpage application, to complete screenshot of the current full-screen page.

In a third aspect, an embodiment of the disclosure provides an image processing apparatus, including a processor, a communication bus, and a memory communicating with the processor through the communication bus and storing one or more programs executable by the processor, the processor is configured to execute any one of the above methods for image processing, when executing the one or more programs.

In a fourth aspect, an embodiment of the disclosure provides a computer-readable storage medium, having stored thereon one or more computer programs, the one or more computer programs is executable by one or more processors to achieve any one of the above methods for image processing.

The embodiments of the disclosure provide an image processing method and apparatus, and a computer-readable storage medium. The method includes the following operations. At least one page image of a current full-screen page is obtained in a webpage application. The at least one page image is converted into at least one file object, and at least one link path of the at least one file object is created, the at least one file object corresponds to the at least one link path one-to-one. At least one picture object is created, and the at least one picture object and the at least one link path are associatively saved in a cache of the webpage application, to complete screenshot of the current full-screen page. According to the method in the embodiments of the disclosure, the image processing apparatus may convert at least one page image into at least one file object after obtaining the at least one page image, and associate a link path of the at least one file object with at least one picture object and save them in the cache, thereby overcoming a technical problem of occupying massive cache caused by converting screenshot pictures into pictures in other encoding formats. Furthermore, at least one picture object of the current full-screen page is saved in the cache, so that when a user re-enters the current full-screen page and wants to take screenshot, the image processing apparatus may obtain the at least one picture object directly from the cache as a corresponding screenshot of the page, without taking screenshot again, which reduces workload processed by browser and ultimately improves screenshot performance of the webpage application.

DETAILED DESCRIPTION

Figure 1:
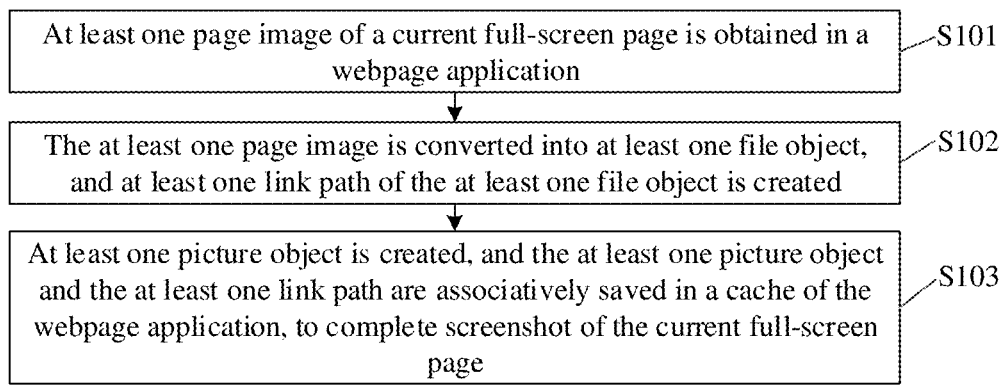
FIG. 1 is an optional schematic flowchart of an image processing method according to an embodiment of the disclosure.

Technical solutions in the embodiments of the disclosure will be described clearly and completely below in conjunction with the drawings in the embodiments of the disclosure.

Before describing the embodiments of the disclosure in further detail, nouns and terms involved in the embodiments of the disclosure are explained. The nouns and terms involved in the embodiments of the disclosure are applicable to explanations below.

canvas: a canvas element in HTML may draw images on a webpage through a JavaScript script. canvas has a variety of ways to draw paths, rectangles, circles, characters, and add images.

<a> tag: <a> is an HTML language tag. The <a> tag defines a hyperlink used to link from one page to another page.

<img> tag: in HTML, the <img> tag is used to embed an image into a webpage. The image embedded by the <img> tag is not inserted into the webpage, instead, it is linked to the webpage. The <img> tag has a function of creating a placeholder for the referenced image.

base64 encoding: base64 is a representation method for representing binary data based on 64 printable characters. base64 requires every three 8-bit bytes to be converted into four 6-bit bytes (3*8=4*6=24), then adds 2 zeros to a high bit of the converted 6-bit to form four 8-bit bytes, and then looks up a corresponding value in an index table according to decimalism of the four 8-bit bytes, and thus the obtained result is Base64 value. Therefore, in theory, a length of the string converted by base64 encoding is longer than a length of the original string by ⅓.

Document Object Model (DOM): DOM provides an access model for the whole document. The document is taken as a tree structure, with each tree node representing an HTML tag or a text item within the tag. Attributes of the DOM tree node characterize a basic content and structural information of the page.

Progressive Web App (PWA): PWA may use a standardized framework workbox-sw on a mobile terminal to simulate some native functions, so that the webpage application presents experience similar to a native application.

Binary Large Object (Blob): a Blob object is binary data similar to a file object, and may be manipulated just like manipulation of the file object.

At present, in some web publicity pages or HTML 5 animations such as an annual bill or survey report of a web application, or the like, a full-screen page usually includes multiple scenes, each scene contains many picture elements and needs to be viewed by sliding on a terminal device to complete browse thereof. When a user is browsing a full-screen page with multiple scenes and wants to take screenshot of each scene and save the picture locally, a current method for taking screenshot is configured to take screenshot of a page of the selected current scene through a canvas drawing method, and convert the picture into base64 encoding format; then wrap the picture by an <a> tag and use a JavaScript script to simulate a click event, so as to save the picture locally; or evoke a native browser method by an <img> tag to prompt the user to long press the picture, so as to save the picture locally. When the local picture is lost, the user has to go to the current browsing page and perform the above operations in case that he/she wants to save screenshot again.

In the current method, canvas rendering is used in a process of converting the picture into base64 encoding format, and the more complex the page is, the longer the canvas rendering time is. Furthermore, base64 picture encoding is a very long string, and a full size of the encoding exceeds a size of the picture itself, however, either browser cookie or a local cache space of the browser is not large. As may be seen, the current method for taking and saving screenshot of the browser is slow in operation, requires a high browser cache, and consumes a lot of browser performance. Therefore, in a practical application, the current method for taking screenshot often reports an error of insufficient storage space due to limitation of the cache space, and cannot take and save screenshot of multiple pictures simultaneously. In general, browser of a mobile terminal cannot cope with more than 9 webpage screenshots in the cache simultaneously. Furthermore, once screenshot obtained through the current method for taking screenshot is lost, the user has to go to the current browsing page and perform the above operations in case that he/she wants to save the screenshot again, which further aggravates consumption of the browser performance.

Referring to FIG. 1, which is an optional schematic flowchart of an image processing method according to an embodiment of the disclosure, and the method will be described in conjunction with operations shown in FIG. 1.

In operation S101, at least one page image of a current full-screen page is obtained in a webpage application.

The image processing method provided in the embodiment of the disclosure is applicable to a scenario where screenshot are taken and saved in a webpage application, exemplarily, a scenario where screenshot of various scenes in a full-screen page are taken and saved through browser on a terminal, or a scenario where screenshot of page contents displayed in multiple screens in a link are taken through an application or client supporting HTML, or the like.

In the operation S101, in case that a user browses a full-screen page with multiple scenes in the webpage application such as browser, multiple scenes in the full-screen page may be browsed by sliding the page, and after the current full-screen page has been loaded, an image processing apparatus may take screenshot of scenes contained in the current full-screen page as needed, and take at least one captured image as at least one page image.

In the embodiment of the disclosure, when a screenshot command is received on the current full-screen page in the webpage application, the image processing apparatus may take an image corresponding to at least one to-be-captured scene specified by the screenshot command as the at least one page image, in response to the screenshot command.

In the embodiment of the disclosure, the image processing apparatus may also obtain an image corresponding to each scene in the current full-screen page as the at least one page image, in response to having loaded the current full-screen page, so that the image processing apparatus may perform a senseless operation for taking screenshot of each scene in the current full-screen page in the background, before the user issues the screenshot command, which may shorten a waiting time after the user issues the screenshot command.

In some embodiments, the image processing apparatus may take screenshot of all or some of the scenes in the current full-screen page through a canvas screenshot method in the browser, to obtain at least one page image. Specifically, an html2canvas( ) method may be called to read a style and content information of each to-be-captured scene and generate a picture by rendering based on the style and content information of each to-be-captured scene, to obtain at least one page image. In some other embodiments, the image processing apparatus may also obtain at least one page image through a Flashcanvas or ExplorerCanvas method, which may be specifically selected according to an actual situation and is not limited in the embodiment of the disclosure.

In the embodiment of the disclosure, pictures obtained through the canvas screenshot method are usually pictures in png format. Pictures in other formats may also be generated according to actual needs, which may be specifically selected according to an actual situation and is not limited in the embodiment of the disclosure.

It should be noted that in the embodiment of the disclosure, at least one page image is obtained after a full-screen page content in the current full-screen page has been loaded, thus the at least one page image is an image created or generated in the webpage application locally.

In operation S102, the at least one page image is converted into at least one file object, and at least one link path of the at least one file object is created, the at least one file object corresponds to the at least one link path one-to-one.

In the operation S102, the image processing apparatus may convert at least one page image in picture format into at least one file object, after obtaining the at least one page image, to implement operations such as accessing and reading contents of the at least one page image, or the like, by manipulating file objects in an HTML page.

In some embodiments, the image processing apparatus may convert at least one page image into at least one Blob object through a canvas.toBlob( ) method, and take the at least one Blob object as at least one file object. In some other embodiments, the image processing apparatus may also convert at least one page image into other file types of webpage objects through other methods, which may be specifically selected according to an actual situation and is not limited in the embodiment of the disclosure.

In the operation S102, the image processing apparatus creates a link path for each file object, after converting at least one page image into at least one file object.

In some embodiments, in case that at least one file object is at least one Blob object, the image processing apparatus may create a Uniform Resource Locator (URL) for each Blob object as a link path corresponding to each Blob object, through a URL.createObjectURL( ) method, thereby obtaining at least one link path.

In the embodiment of the disclosure, each of at least one link path points to a file object corresponding to each of the at least one link path. Therefore, the image processing apparatus may associate at least one file object with other types of webpage objects such as picture objects through the at least one link path, so that other types of webpage objects may refer to data in the at least one file object as source data by way of specifying the link path, and then, diverse ways of processing at least one file object are obtained through operations of other types of webpage objects In operation S103, at least one picture object is created, and the at least one picture object and the at least one link path are associatively saved in a cache of the webpage application, to complete screenshot of the current full-screen page.

In the operation S103, the image processing apparatus creates at least one object in picture type, i.e., at least one picture object, in a local cache of the webpage application, and points at least one link path to the at least one picture object, thereby associating at least one link path with the at least one picture object; and the image processing apparatus saves the at least one link path together with the at least one picture object in the cache of the webpage application, thereby completing screenshot of the current full-screen page.

In some embodiments, the image processing apparatus may create at least one picture object through a new Image( ) method. For an picture object created through the new Image( ) method, the image processing apparatus may assign a link path as an src property of the picture object, so that when the picture object is loaded, a file object corresponding to a corresponding link path may be accessed through the corresponding link path, and contents of the file object may be taken as content data of a picture to be loaded in the picture object, thereby achieving mutual association of the picture object, the link path and the file object.

In the operation S103, in order to further accelerate the process of taking screenshot, the image processing apparatus may also save at least one link path in cookie of the webpage application, so that the image processing apparatus may check, before taking screenshot of the current full-screen page, whether at least one link path of the screenshot already exists in the cookie of the webpage application, and obtain at least one picture object directly from a history cache through the at least one link path. Therefore, it is unnecessary to take screenshot of the same page again.

It may be understood that in the embodiment of the disclosure, the image processing apparatus may convert at least one page image into at least one file object after obtaining the at least one page image, and associate a link path of the at least one file object with at least one picture object and save them in the cache, thereby overcoming a technical problem of occupying massive cache caused by converting screenshot pictures into other encoding formats. Furthermore, since at least one picture object of the current full-screen page is saved in the cache, so that when a user re-enters the current full-screen page and wants to take screenshot, the image processing apparatus may obtain the at least one picture object directly from the cache as a corresponding screenshot of the page, without taking screenshot again, which reduces workload processed by browser and ultimately improves screenshot performance of the webpage application.

Figure 2:
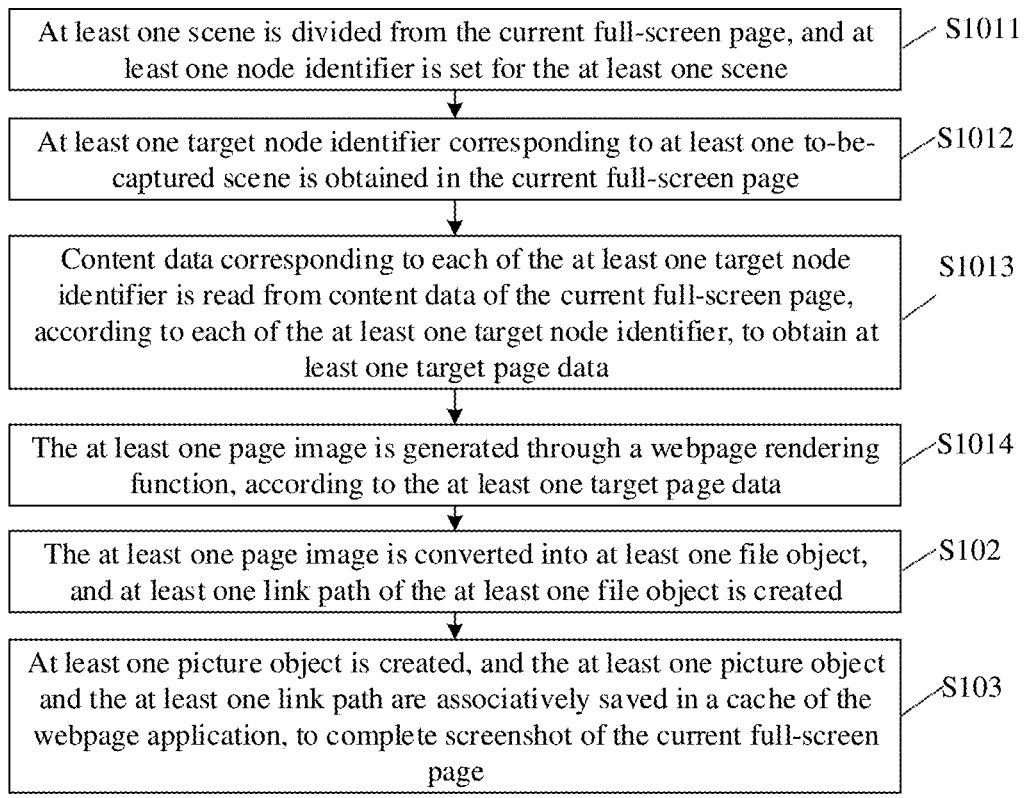
FIG. 2 is an optional schematic flowchart of an image processing method according to an embodiment of the disclosure.

Referring to FIG. 2, which is an optional schematic flowchart of an image processing method according to an embodiment of the disclosure. Based on FIG. 1, the operation S101 shown in FIG. 1 may be implemented by operations S1011 to S1014, and will be described in conjunction with the operations.

In operation S1011, at least one scene is divided from the current full-screen page, and at least one node identifier (ID) is set for the at least one scene, the at least one node identifier characterizes at least one layout point corresponding to the at least one scene in the current full-screen page, and the at least one scene corresponds to the at least one node identifier one-to-one.

In the operation S1011, for the current full-screen page which has been loaded, the image processing apparatus may divide at least one scene from the current full-screen page, based on a style or content displayed by the current full-screen page, so that a to-be-captured scene may be specified from the at least one scene subsequently. Accordingly, the image processing apparatus sets at least one node identifier for the at least one scene, and the at least one scene corresponds to the at least one node identifier one-to-one.

In the embodiment of the disclosure, the at least one scene is a page scene contained in the current full-screen page, such as images or text contents on different positions contained in the current full-screen page, or each screen page contained in the current full-screen page, or the like.

In the embodiment of the disclosure, the at least one node identifier characterizes at least one data location corresponding to the at least one scene in the current full-screen page. In other words, the node identifier is location where content data of a webpage object corresponding to the node identifier is stored in the overall content data corresponding to the current full-screen page. Exemplarily, the overall content data corresponding to the current full-screen page may be an HTML text, and when the browser parses the HTML text, the browser may construct a DOM tree according to an associative relation of webpage objects in the HTML text. The at least one node identifier may be a document node in the DOM tree of the current full-screen page, and each DOM node stores content data corresponding to each webpage object, and each DOM node is mutually associated with other DOM nodes in the DOM tree.

In some embodiments, the image processing apparatus may set a DOM style as being displayed on one screen in the current full-screen page, in other words, take each screen page in the full-screen page as a scene, and the image processing apparatus sets a different DOM ID for each screen and takes the DOM ID as the at least one node identifier.

In operation S1012, at least one target node identifier corresponding to at least one to-be-captured scene is obtained in the current full-screen page, the at least one to-be-captured scene is a target screenshot scene in the at least one scene.

In the operation S1012, in the current full-screen page, the image processing apparatus determines at least one to-be-captured scene based on the screenshot command, or takes all the scenes in the current full-screen page as the at least one to-be-captured scene by default, and obtains at least one target node identifier corresponding to the at least one to-be-captured scene.

In operation S1013, content data corresponding to each of the at least one target node identifier is read from content data of the current full-screen page, according to each of the at least one target node identifier, to obtain at least one target page data.

In the embodiment of the disclosure, for each of the at least one node identifier, the image processing apparatus locates, according to each node identifier, a storage location of content data corresponding to a webpage object represented by the node identifier in the overall content data of the current full-screen page, and reads, according to the storage location of data corresponding to each node identifier, the content data of each webpage object corresponding to the node identifier, thereby obtaining at least one target page data.

In operation S1014, the at least one page image is generated through a webpage rendering function, according to the at least one target page data.

In the embodiments of the disclosure, the image processing apparatus may generate at least one page image through a webpage rendering function, such as a canvas drawing method, according to at least one target page data, after reading the at least one target page data.

It may be understood that in the embodiment of the disclosure, different forms of screenshot may be taken on the current full-screen page by presetting different styles of node identifiers, thereby increasing flexibility of taking screenshot of a page.

Figure 3:
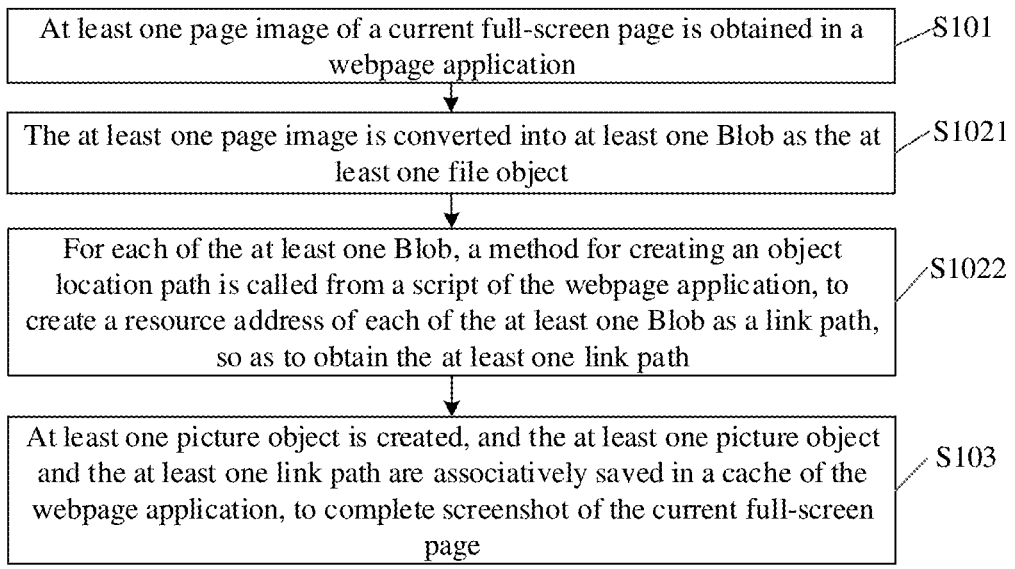
FIG. 3 is an optional schematic flowchart of an image processing method according to an embodiment of the disclosure.

In an embodiment of the disclosure, referring to FIG. 3, which is an optional schematic flowchart of an image processing method according to an embodiment of the disclosure. The operation S102 shown in FIG. 1 may be implemented by operations S1021 to S1022, and will be described in conjunction with the operations.

In operation S1021, the at least one page image is converted into at least one Blob as the at least one file object.

In the operation S1021, the image processing apparatus may call, from a webpage drawing method, a method for converting pictures into Blobs, after obtaining at least one page image, to convert the at least one page image into at least one Blob as the at least one file object.

In some embodiments, the image processing apparatus performs format conversion of at least one page image through a canvas.toBlob( ) method, to converts the at least one page image into at least one Blob object as at least one file object.

In the operation S1021, comparing to the current method for taking screenshot, the image processing apparatus uses the canvas.toBlob( ) method, instead of a canvas.toDataURL method, to convert the page image, because a page image converted by the canvas.toDataURL method is in base64 encoding format, and has a data size larger than a data size of the original picture, which may occupy more caches of the webpage application and cause reporting an error of taking screenshot.

In operation S1022, for each of the at least one Blob, a method for creating an object location path is called from a script of the webpage application, to create a resource address of each of the at least one Blob as a link path, so as to obtain the at least one link path.

In the operation S1022, after the image processing apparatus converts at least one page image into at least one Blob object, a URL.createObjectURL( ) method is called for each Blob object, to create a URL address corresponding to each Blob object as a link path of the Blob object, thereby obtaining at least one link path.

In the embodiment of the disclosure, the operation of calling the URL.createObjectURL( ) method may return a URL string with a hash value, to specify a Blob object correspond to the string.

It may be understood that in the embodiment of the disclosure, the image processing apparatus converts at least one page image into a Blob object and its corresponding path through the canvas.toBlob( ) method in conjunction with the URL.createObjectURL( ) method. The converted picture and path data has a small size and occupy a little cache of the webpage application, which does not cause reporting errors such as out of memory, or the like, thereby improving screenshot performance of the webpage application.

Figure 4:
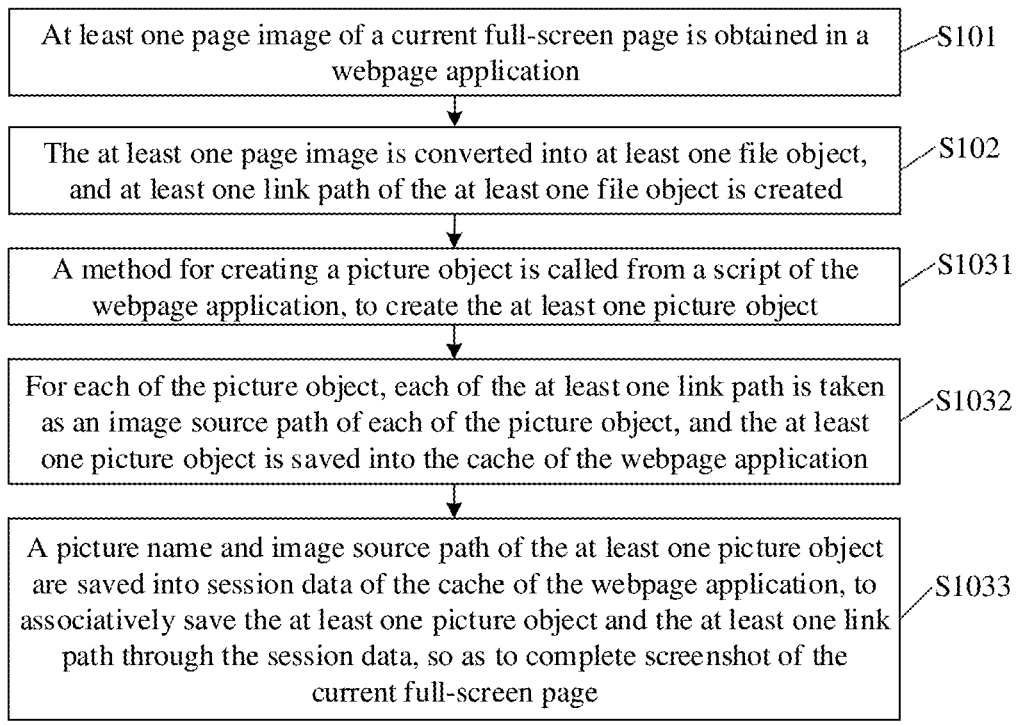
FIG. 4 is an optional schematic flowchart of an image processing method according to an embodiment of the disclosure.

In an embodiment of the disclosure, referring to FIG. 4, which is an optional schematic flowchart of an image processing method according to an embodiment of the disclosure. The operation S103 shown in FIG. 1 may be implemented by operations S1031 to S1033, and will be described in conjunction with the operations.

In operation S1031, a method for creating a picture object is called from a script of the webpage application, to create the at least one picture object.

In the operation S1031, the image processing apparatus calls a method for creating a picture object, such as a new image( ) method, from a script of the webpage application, to create at least one picture object in the cache of the webpage application.

In operation S1033, a picture name and image source path of the at least one picture object are saved into session data of the cache of the webpage application, to associatively save the at least one picture object and the at least one link path through the session data, so as to complete screenshot of the current full-screen page.

In the operation S1033, the image processing apparatus may call a method for setting session data, to save the picture name and image source path of the at least one picture object into the session data of the cache of the webpage application, such as cookie, to obtain at least one link path from the session data and then obtain at least one picture object associated with the at least one link path, so as to complete taking screenshot of the current full-screen page and saving the screenshot in the cache.

In some embodiments, the image processing apparatus may save a picture name, URL and valid time of at least one picture object into the cookie by calling a setCookie( ) method. A corresponding code implementation may be shown as follows.

```
canvas.toBlob(function(blobObj){
let imgs = new Image( ); //create a picture object
let src = window.URL.createObjectURL(blobObj); //create a link path of a Blob
object
imgs.src = src; //assign a value to an image source path of the picture object by
using the link path
screenShotCut[ary[i].component] = src; //save the link path into cookie
setCookie('imgSrc',JSON.stringify(screenShotCut))
})
```

In the embodiment of the disclosure, the picture object created by the new image( ) method contains information such as a picture name, an src property, or the like, here the src property is required and a value of the src property is URL of the picture object, i.e., an absolute path or a relative path of a file referring to the picture object.

In some embodiments, the image processing apparatus may also create at least one picture object by other means supported by the webpage application, which may be specifically selected according to an actual situation and is not limited in the embodiment of the disclosure.

In operation S1032, for each of the picture object, each of the at least one link path is taken as an image source path of each of the picture object, and the at least one picture object is saved into the cache of the webpage application, the image source path is a path for obtaining content data when each of the picture object is loaded.

In the operation S1032, after the image processing apparatus creates at least one picture object, the image processing apparatus takes a link path corresponding to each of the picture object as an image source path of the picture object, which is a path for obtaining content data when each of the picture object is loaded in the webpage, thereby taking at least one file object as content data of the at least one picture object and achieving association between the at least one file object and the at least one picture object.

In the operation S1032, the image processing apparatus may take each link path as an image source path of each of the picture object by assigning a value.

In the operation S1032, the image processing apparatus saves at least one picture object into the cache of the webpage application, so that a corresponding picture object may be opened from the local cache of the webpage application during a next access.

In some embodiments, the above setCookie( ) method may be implemented by codes as follows:

```
setCookie(name,value,iMinutes){
    var oDate = new Date( );
    oDate.setMinutes(oDate.getMinutes( )+iMinutes);
    document.cookie = name+'='+encodeURIComponent(value)
    +';expires='+oDate;
},
```

It may be understood that in the embodiment of the disclosure, after the image processing apparatus associates a link path of at least one file object with at least one picture object and saves them in the cache, and then saves at least one link path in the session data of the cache of the webpage application, when a user re-enters the current full-screen page, the image processing apparatus may obtain the at least one picture object directly from the cache as a corresponding screenshot of the page, without taking screenshot again, which reduces workload processed by browser and ultimately improves screenshot performance of the webpage application.

Figure 5:
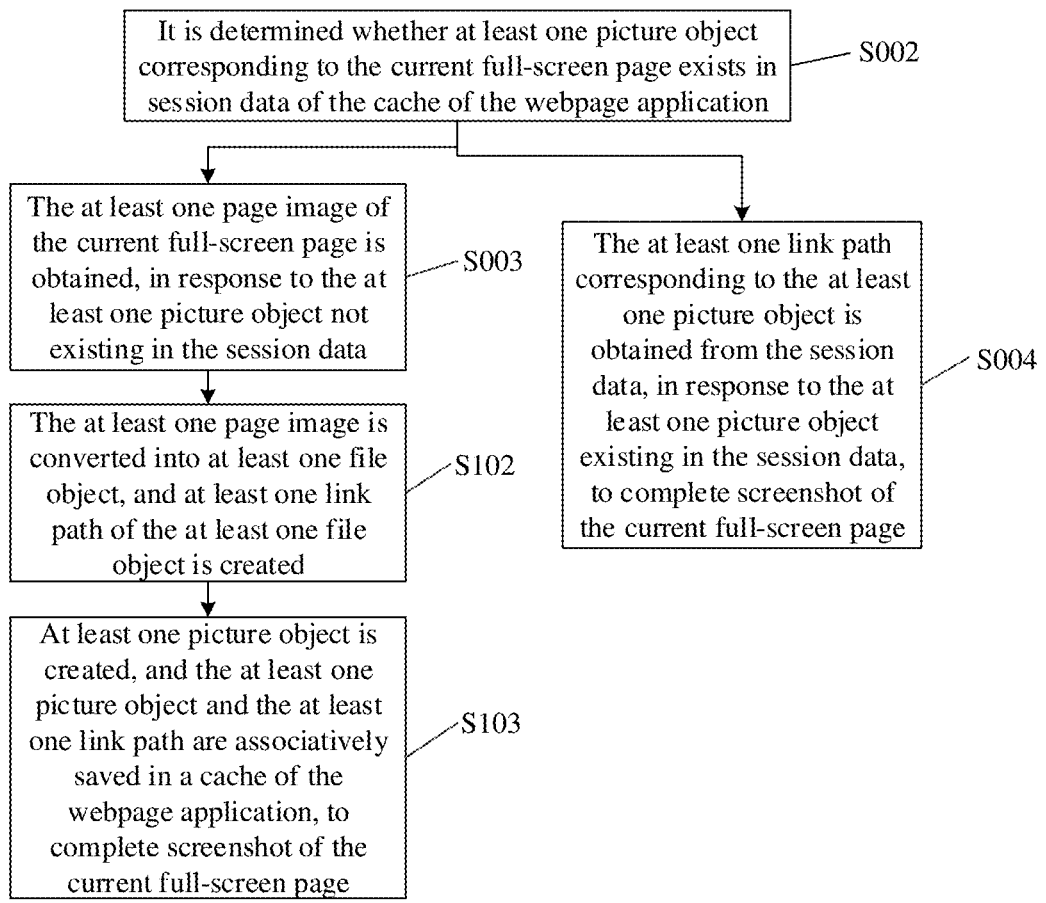
FIG. 5 is an optional schematic flowchart of an image processing method according to an embodiment of the disclosure.

In an embodiment of the disclosure, referring to FIG. 5, which is an optional schematic flowchart of an image processing method according to an embodiment of the disclosure. The operation S101 shown in FIG. 1 may be implemented by operations S002 to S003, and will be described in conjunction with the operations.

In operation S002, it is determined whether at least one picture object corresponding to the current full-screen page exists in session data of the cache of the webpage application.

In the operation S002, the image processing apparatus may check session data of the cache of the webpage application, before obtaining at least one page image, to determine whether at least one picture object corresponding to the current full-screen page exists in the session data.

In the embodiment of the disclosure, the process of determining, by the image processing apparatus, whether at least one picture object corresponding to the current full-screen page exists in session data of the cache of the webpage application may be implemented as following operations.

In operation S0021, a method for obtaining session data is called according to a picture name of the at least one picture object, to extract the at least one picture object from the session data.

In some embodiments, when the user accesses the current full-screen page through the webpage application, the image processing apparatus may call a getCookie( ) method to obtain cookie data of the webpage application, before calling the canvas screenshot method to obtain at least one page image, and determine whether at least one picture object already exists in the cookie data through a newImg.load method.

In some embodiments, the operation of determining, by the image processing apparatus, whether at least one picture object corresponding to at least one link path exists in the cache of the webpage application may be shown as following.

```
async canShot( ){
let imgsrc = getCookie('imgsrc'); //check a picture
if(imgSrc){
    let imgAys = JSON.pase(imgSrc);
    imgAys.map(item=>{
let newImg = new Imgage( );
newImg.src = item;
newImg,load = ( )=>{ //check whether the picture still exists in the cache
}
})
}else{
    let ary = this.comps; //ID of a to-be-captured page
    let i = ary,length;
    let shotCanvas = async( )=>{
    ...
}
shotCanvas( );
}
}
```

In some embodiments, the above setCookie( ) method may be implemented by codes as follows:

```
getCookie(name){
    var arr = document.cookie.split(';');
    var i = 0;
    for (var i=0;i<arr.length;i++){
        var arr2 = arr[i].split('=');
        if(arr2[0]==name){
    return decodeURIComponent(arr2[1]);
    }
    }
    return '';
},
```

In operation S0022, it is determined that the at least one picture object exists in the session data, in response to successfully calling the method for obtaining session data.

In the embodiment of the disclosure, when the method for obtaining session data is called successfully, exemplarily, the above getCookie('imgsrc') method returns a picture object corresponding to imgsrc successfully, indicating that the picture object already exists in the session data, and the image processing apparatus confirms that at least one picture object exists in the session data.

In operation S0023, it is determined that the at least one picture object does not exist in the session data, in response to failing to call the method for obtaining session data.

In the embodiment of the disclosure, when it fails to call the method for obtaining session data, the image processing apparatus confirms that at least one picture object does not exist in the session data.

In operation S003, the at least one page image of the current full-screen page is obtained, in response to the at least one picture object not existing in the session data.

In the embodiment of the disclosure, the image processing apparatus obtains at least one page image of the current full-screen page, in response to at least one picture object not existing in the session data, and takes screenshot of the current full-screen page through the methods in the above operations S102 to S103.

In an embodiment of the disclosure, as shown in FIG. 5, an operation S004 may also be included after the operation S002, as follows.

In operation S004, the at least one link path corresponding to the at least one picture object is obtained from the session data, in response to the at least one picture object existing in the session data, to complete screenshot of the current full-screen page.

In the operation S004, when at least one picture object exists in the cache of the webpage application, the image processing apparatus completes screenshot of the current full-screen page without performing the operation of obtaining at least one page image.

It may be understood that in the embodiment of the disclosure, the image processing apparatus may quickly locate at least one to-be-captured picture object from the cookie of the webpage application, without taking screenshot of the same page again, which improves reusability of cached pictures, thereby reducing screenshot workload of the webpage application and improving screenshot performance of the webpage application.

Figure 6:
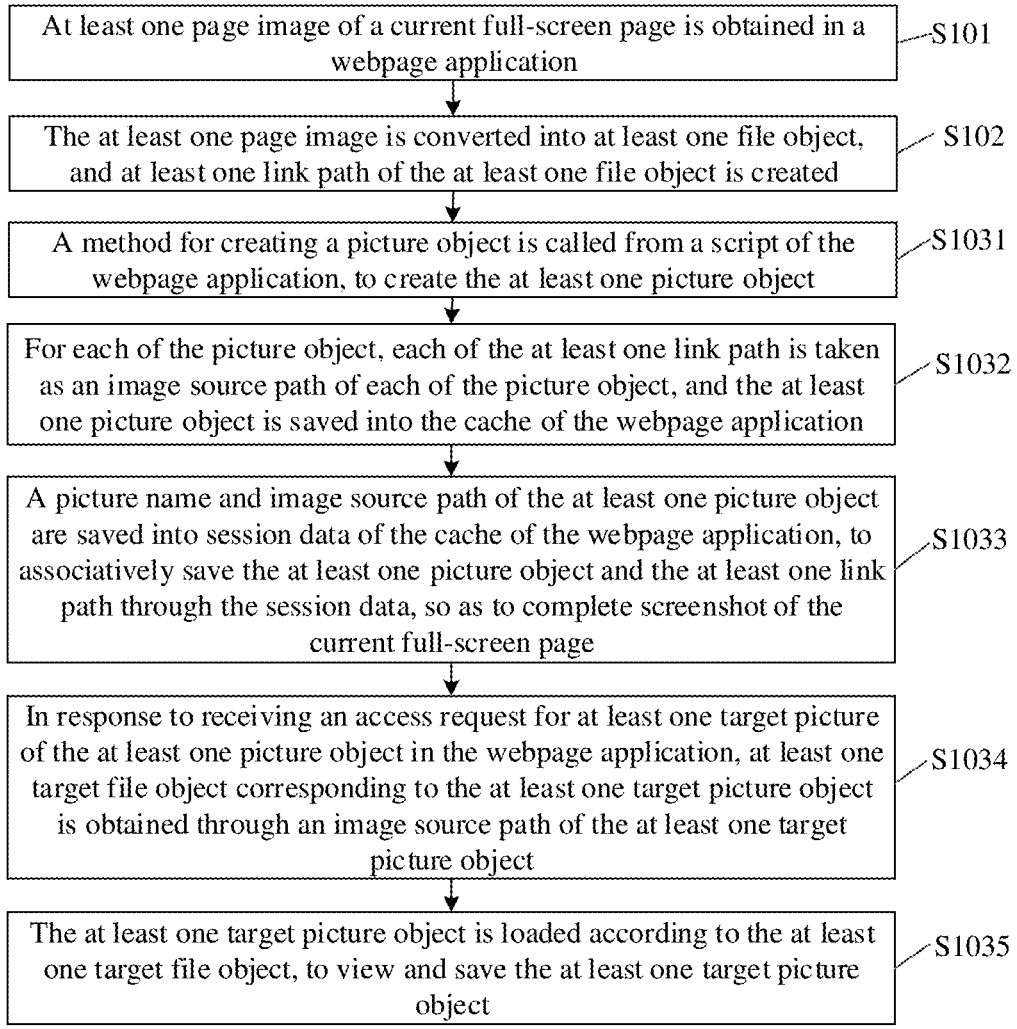
FIG. 6 is an optional schematic flowchart of an image processing method according to an embodiment of the disclosure.

In an embodiment of the disclosure, referring to FIG. 6, which is an optional schematic flowchart of an image processing method according to an embodiment of the disclosure. Based on FIG. 4 or FIG. 5, operations S1034 to S1035 may also be performed after the operation S1033 or S10, and will be described in conjunction with the operations.

In operation S1034, in response to receiving an access request for at least one target picture of the at least one picture object in the webpage application, at least one target file object corresponding to the at least one target picture object is obtained through an image source path of the at least one target picture object, a link path of the target file object is the same as the image source path of the target picture object.

In the operation S1034, in case of viewing and further saving webpage screenshot in the webpage application, the image processing apparatus may receive an access request for at least one target picture of at least one picture object in the webpage application.

In the embodiment of the disclosure, the at least one target picture characterizes to-be-extracted screenshot in the at least one picture object. The image processing apparatus may determine at least one to-be-extracted target picture based on picture name carried in the access request.

In the operation S1034, since a link path of a file object is the same as an image source path of a picture object, the image processing apparatus may read a target file object from at least one file object correspondingly through an image source path of each target picture object.

In operation S1035, the at least one target picture object is loaded according to the at least one target file object, to view and save the at least one target picture object.

In the operation S1035, the image processing apparatus loads each target picture object in the webpage application, according to content data in a target file object corresponding to each target picture object, and then achieves extraction, viewing and saving of each target picture object.

It may be understood that in the embodiment of the disclosure, the image processing apparatus may take at least one file object as content data of at least one picture object through at least one link path, so that a to-be-loaded target picture object may be associatively loaded by accessing at least one target link path in the at least one link path, thereby viewing and saving a to-be-captured scene in the cache of the webpage application, and improving screenshot performance of the webpage application.

An exemplary application of the embodiments of the disclosure in a practical application scene is described as follows.

Figure 7A:
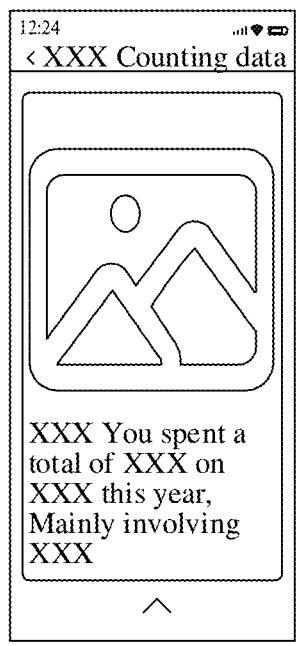
FIG. 7A is a first schematic interface diagram of a process of taking screenshot of a webpage application according to an embodiment of the disclosure.
Figure 7B:
FIG. 7B is a second schematic interface diagram of a process of taking screenshot of a webpage application according to an embodiment of the disclosure.
Figure 7C:
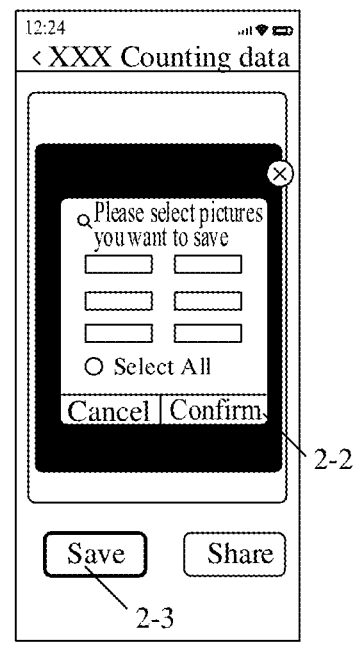
FIG. 7C is a third schematic interface diagram of a process of taking screenshot of a webpage application according to an embodiment of the disclosure.

In some embodiments of the disclosure, when a user browses pages such as summary report or activity survey through browser or a webpage application, interface interaction effects may be shown in FIG. 7A to FIG. 7C. In FIG. 7A, the user may slide up and down in a page to browse contents shown in each screen page in the whole webpage. When the user slides to browse the last page, as shown in FIG. 7B, the webpage application may generate a long screenshot of at least one screen page in the whole webpage and display a save button control 2-1 on the interface, prompting the user to save the generated long screenshot of the whole webpage through the save button control 2-1, or downloading and saving the long screenshot directly in the background. As shown in FIG. 7C, the webpage application may also generate a screenshot preview picture correspondingly for each screen page in the whole webpage, and display the screenshot preview picture as a thumbnail on the current page. The user may select one or more screenshot preview pictures to save them by clicking thumbnails, and complete the selection through a confirmation button control 2-2. After completing the selection through the confirmation button control 2-2, the user may save page pictures corresponding to one or more screenshot preview pictures confirmed to be selected, by further clicking a save button 2-3.

Figure 8:
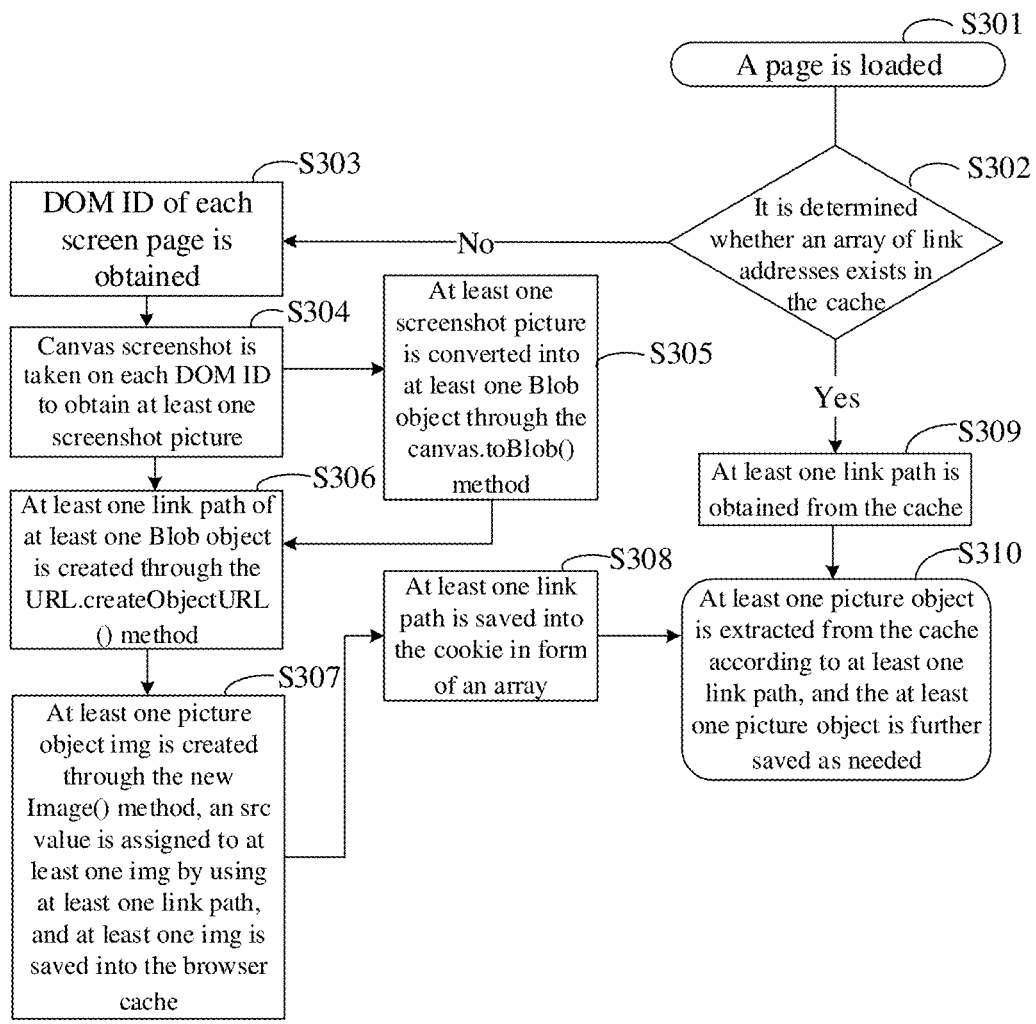
FIG. 8 is an optional schematic flowchart of an image processing method according to an embodiment of the disclosure.

In the embodiments of the disclosure, after the user clicks the save control 2-1 or the save control 2-3 on the interface shown in FIG. 7B or FIG. 7C, the image processing apparatus may receive a screenshot command in the webpage application. Exemplarily, when the user selects multiple page pictures on the interface shown in FIG. 7C and clicks the save control 2-3, the image processing apparatus may take screenshot of the selected multiple page pictures and save them through the operations S301-S307, as shown in FIG. 8.

In operation S301, a page is loaded.

In the operation S301, the image processing apparatus loads the whole webpage in the browser.

In operation S302, it is determined whether an array of link addresses exists in the cache.

In the operation S302, the image processing apparatus determines whether an array of link addresses exists in the cache, after loading the whole webpage. If yes, operations S303 to S308 are performed, otherwise, an operation S309 is performed.

In the operation S302, the array of link addresses contains at least one link address. The at least one link address is an original address of at least one picture object, and the at least one picture object may be at least one screenshot picture corresponding to the whole webpage.

A process of implementing the operation S302 is the same as descriptions of the operation S002, and elaboration thereof is not repeated here.

In operation S303, DOM ID corresponding to each screen page in the whole webpage is obtained.

In the operation S303, the image processing apparatus may generate an array of DOM IDs by the obtained DOM ID corresponding to each screen page.

In the operation S303, the image processing apparatus takes at least one DOM ID contained in the array of DOM IDs as at least one node identifier. A process of implementing the operation S303 is the same as descriptions of the operation S1011, and elaboration thereof is not repeated here.

In operation S304, Canvas screenshot is taken on each DOM ID to obtain at least one screenshot picture.

A process of implementing the operation S304 is the same as descriptions of the operations S1012 to S1014, and elaboration thereof is not repeated here.

In operation S305, at least one screenshot picture is converted into at least one Blob object through the canvas-.toBlob( ) method.

A process of implementing the operation S305 is the same as descriptions of the operation S1021, and elaboration thereof is not repeated here.

In some embodiments, the operations S303-S305 may be implemented exemplarily by codes as follows:

```
async canShot( ){
    let ary = this.comps; //an array this.comps stores all the to-be-captured
    DOM IDs
    let i = ary.length;
    let shotCanvas = async ( )=>{
      i--;
      if(ary[i]){ //take screenshot of a page content corresponding to each DOM ID
        let canvas = await html2canvas
(document.querySelector('.${ary[i].component}'),{useCORS;true})
            canvas.toBlob(function(blobObj) {...})
            shotCanvas( )
      }
    }
    shotCanvas( )
}
```

In operation S306, at least one link path of at least one Blob object is created through the URL.createObjectURL( ) method.

A process of implementing the operation S306 is the same as descriptions of the operation S1022, and elaboration thereof is not repeated here.

In operation S307, at least one picture object img is created through the new Image( ) method, an src value is assigned to at least one img through at least one link path, and at least one img is saved into the browser cache.

A process of implementing the operation S307 is the same as descriptions of the operations S1031 to S1032, and elaboration thereof is not repeated here.

In operation S308, at least one link path is saved into the cookie in form of an array.

A process of implementing the operation S308 is the same as descriptions of the operation S1033, and elaboration thereof is not repeated here.

In operation S309, at least one link path is obtained from the cache.

In the operation S309, when at least one link path exists in the cache, the image processing apparatus does not take screenshot again and obtains the at least one link path directly.

In operation S310, at least one picture object is extracted from the cache according to at least one link path, and the at least one picture object is further saved as needed.

A process of implementing the operation S310 is the same as descriptions of the operations S1034 to S1035, and elaboration thereof is not repeated here.

It may be understood that through the above operations, the image processing apparatus may take multi-screen screenshot and optional screenshot, which overcomes a technical problem of a long time of rendering picture screenshot, and improves reusability of cached screenshot, thereby improving screenshot performance of the webpage application.

Furthermore, in the embodiments of the disclosure, the image processing apparatus may cache a specified type of page images through a PWA technology, specifically, a workbox-sw plugin is introduced to compulsorily cache pictures under a path of blob:null/. Exemplary codes are shown as follows.

```
importScripts('workbox-sw.prod.v1.1.0.js');
const workbox = new self.WorkboxSW( ); //Match any request under the path of
blob:null/ to cache
workBox.router.registerRoute('blob:null/(.*)',workbox.stragtegies.cacheFirst( ))
```

It may be understood that when the image processing apparatus saves screenshot pictures through the cache of the webpage application such as the cache space of the browser, there may be instability factors, such as timeliness, users' agnostic behavior, or the like. The image processing apparatus may cache pictures through Service Worker in the PWA technology, to achieve a stable and controllable effect of caching pictures.

Figure 9:
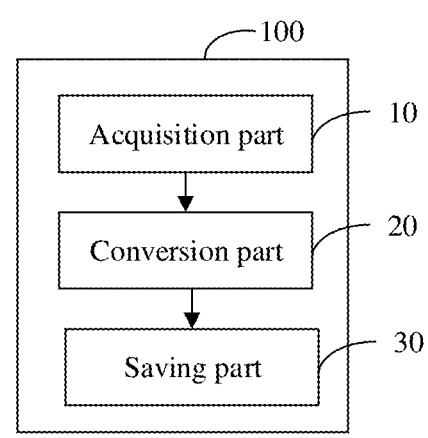
FIG. 9 is a first schematic structural diagram of an image processing apparatus according to an embodiment of the disclosure.

An embodiment of the disclosure provides an image processing apparatus corresponding to an image processing method, and FIG. 9 is a first schematic structural diagram of an image processing apparatus according to an embodiment of the disclosure. As shown in FIG. 9, the image processing apparatus 100 includes an acquisition part 10, a conversion part 20 and a saving part 30.

The acquisition part 10 is configured to obtain at least one page image of a current full-screen page in a webpage application.

The conversion part 20 is configured to convert the at least one page image into at least one file object, and create at least one link path of the at least one file object, the at least one file object corresponds to the at least one link path one-to-one.

The saving part 30 is configured to create at least one picture object, and associatively save the at least one picture object and the at least one link path in a cache of the webpage application, to complete screenshot of the current full-screen page.

In some embodiments of the disclosure, the conversion part 20 is further configured to: convert the at least one page image into at least one Blob as the at least one file object; and call, from a script of the webpage application, a method for creating an object location path, to create a resource address of each of the at least one Blob as a link path, so as to obtain the at least one link path.

In some embodiments of the disclosure, the saving part 30 is further configured to: call, from a script of the webpage application, a method for creating a picture object, to create the at least one picture object; take each of the at least one link path as an image source path of each of the picture object, and save the at least one picture object into the cache of the webpage application, the image source path is a path for obtaining content data when each of the picture object is loaded; and save a picture name and image source path of the at least one picture object into session data of the cache of the webpage application, to associatively save the at least one picture object and the at least one link path through the session data, so as to complete screenshot of the current full-screen page.

In some embodiments of the disclosure, the image processing apparatus 100 further includes an examination part. The examination part is configured to determine whether at least one picture object corresponding to the current full-screen page exists in session data of the cache of the webpage application. The acquisition part 10 is further configured to obtain the at least one page image of the current full-screen page, in response to the at least one picture object not existing in the session data.

In some embodiments of the disclosure, the acquisition part 10 is further configured to: after determining whether at least one picture object corresponding to the current full-screen page exists in the session data of the cache of the webpage application, obtain the at least one link path corresponding to the at least one picture object from the session data, in response to the at least one picture object existing in the session data, to complete screenshot of the current full-screen page.

In some embodiments of the disclosure, the acquisition part 10 is further configured to obtain an image corresponding to each scene in the current full-screen page as the at least one page image, in response to having loaded the current full-screen page.

In some embodiments of the disclosure, the acquisition part 10 is further configured to: when a screenshot command is received on the current full-screen page, take an image corresponding to at least one to-be-captured scene specified by the screenshot command as the at least one page image, in response to the screenshot command.

In some embodiments of the disclosure, the image processing apparatus 100 further includes an extraction part. The extraction part is further configured to: in response to receiving an access request for at least one target picture of the at least one picture object in the webpage application after completing screenshot of the current full-screen page, obtain, through an image source path of the at least one target picture object, at least one target file object corresponding to the at least one target picture object, a link path of the target file object is the same as the image source path of the target picture object; and load the at least one target picture object according to the at least one target file object, to view and save the at least one target picture object.

In some embodiments of the disclosure, the image processing apparatus 100 further includes an identification part. The identification part is configured to: divide at least one scene from the current full-screen page and set at least one node identifier for the at least one scene, before obtaining at least one page image of the current full-screen page in the webpage application, the at least one scene is a page scene contained in the current full-screen page, the at least one node identifier characterizes at least one data location corresponding to the at least one scene in the current full-screen page, and the at least one scene corresponds to the at least one node identifier one-to-one.

The acquisition part 10 is further configured to obtain at least one target node identifier corresponding to at least one to-be-captured scene in the current full-screen page, the at least one to-be-captured scene is a target screenshot scene in the at least one scene; read, according to each of the at least one target node identifier, content data corresponding to each of the at least one target node identifier from content data of the current full-screen page, to obtain at least one target page data; and generate, through a webpage rendering function, the at least one page image according to the at least one target page data.

In some embodiments of the disclosure, the conversion part 20 is further configured to call, from a webpage drawing method, a method for converting pictures into Blobs, to convert the at least one page image into at least one Blob as the at least one file object.

In some embodiments of the disclosure, the saving part 30 is further configured to call a method for setting session data, to save the picture name and image source path of the at least one picture object into the cache of the webpage application.

In some embodiments of the disclosure, the examination part is further configured to call, according to a picture name of the at least one picture object, a method for obtaining session data, to extract the at least one picture object from the session data; determine that the at least one picture object exists in the session data, in response to successfully calling the method for obtaining session data; and determine that the at least one picture object does not exist in the session data, in response to failing to call the method for obtaining session data.

Figure 10:
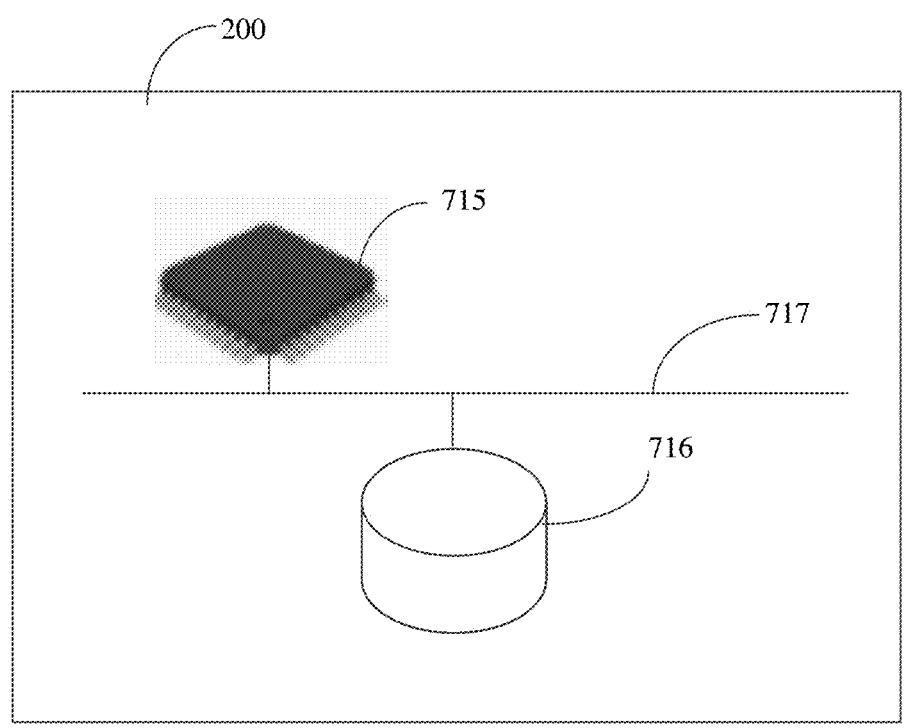
FIG. 10 is a second schematic structural diagram of an image processing apparatus according to an embodiment of the disclosure.

An embodiment of the disclosure provides an image processing apparatus corresponding to an image processing method, and FIG. 10 is a second schematic structural diagram of an image processing apparatus according to an embodiment of the disclosure. As shown in FIG. 10, the image processing apparatus 200 includes a processor 715, a memory 716 and a communication bus 717, the memory 716 communicates with the processor 715 through the communication bus 717 and stores instructions executable by the processor 715, the processor 715 is configured to execute the image processing method according to any one of the above embodiments when executing the instructions.

An embodiment of the disclosure provides a computer-readable storage medium, applied to an image processing apparatus and having stored thereon one or more computer programs, the one or more computer programs is executable by one or more processors to achieve the image processing method according to any one of the above embodiments.

It should be understood by those skilled in the art that the embodiments of the disclosure may be provided as methods, systems, or computer program products. Therefore, the disclosure may take a form of hardware embodiments, software embodiments, or a combination of software and hardware embodiments. Furthermore, the disclosure may take a form of computer program products implemented on one or more computer-usable storage mediums (including, but not limited to, disk memory, optical memory, or the like) containing computer-usable program codes.

The disclosure is described with reference to flowcharts and/or block diagrams of methods, devices (systems) and computer program products according to the embodiments of the disclosure. It should be understood that each process and/or block in the flowchart and/or block diagram, and a combination of processes and/or blocks in the flowchart and/or block diagram may be implemented by computer program instructions. These computer program instructions may be provided to a processor of a general purpose computer, a specialized computer, an embedded processor or another programmable data processing device, to generate a machine, so that instructions executed by a processor of a computer or another programmable data processing device generate a device for implementing functions specified in one or multiple processes of the flowchart and/or one or multiple blocks of the block diagram.

These computer program instructions may also be stored in a computer-readable memory which may guide a computer or another programmable data processing device to operate in a particular manner, so that instructions stored in the computer-readable memory generate a product including an instruction device, and the instruction device implements the functions specified in one or multiple processes of the flowchart and/or one or multiple blocks of the block diagram.

These computer program instructions may also be loaded into a computer or another programmable data processing device, so that a series of operations are performed in the computer or another programmable devices to generate processes implemented by the computer, and thus instructions executed in the computer or another programmable device provide operations for implementing the functions specified in one or multiple processes of the flowchart and/or one or multiple blocks of the block diagram.

The above descriptions are only preferred embodiments of the disclosure and are not intended to limit the scope of protection of the disclosure.

INDUSTRIAL APPLICABILITY

According to the methods in the embodiments of the disclosure, the image processing apparatus may convert at least one page image into at least one file object after obtaining the at least one page image, and associate a link path of the at least one file object with at least one picture object and save them in the cache, thereby overcoming a technical problem of occupying massive cache caused by converting screenshot pictures into other encoding formats.

Furthermore, at least one picture object of the current full-screen page is saved in the cache, so that when a user re-enters the current full-screen page and wants to take screenshot, the image processing apparatus may obtain the at least one picture object directly from the cache as a corresponding screenshot of the page, without taking screenshot again, which reduces workload processed by browser and ultimately improves screenshot performance of the webpage application.

The invention claimed is:

1. An image processing method, comprising:
   obtaining at least one page image of a current full-screen page in a webpage application;
   converting the at least one page image into at least one file object, and creating at least one link path of the at least one file object, the at least one file object corresponding to the at least one link path one-to-one; and
   creating at least one picture object, and associatively saving the at least one picture object and the at least one link path in a cache of the webpage application, to complete screenshot of the current full-screen page;
   wherein creating the at least one picture object, and associatively saving the at least one picture object and the at least one link path in the cache of the webpage application, to complete the screenshot of the current full-screen page comprises:
      calling, from a script of the webpage application, a method for creating a picture object, to create the at least one picture object;
      taking each of the at least one link path as an image source path of each of the picture object, and saving the at least one picture object into the cache of the webpage application, the image source path being a path for obtaining content data when each of the picture object is loaded; and
      saving a picture name and image source path of the at least one picture object into session data of the cache of the webpage application, to associatively save the at least one picture object and the at least one link path through the session data, so as to complete the screenshot of the current full-screen page.

2. The method of claim 1, wherein converting the at least one page image into the at least one file object, and creating the at least one link path of the at least one file object comprises:
   converting the at least one page image into at least one binary large object (Blob) as the at least one file object; and
   calling, from the script of the webpage application, a method for creating an object location path, to create a resource address of each of the at least one Blob as a link path, to obtain the at least one link path.

3. The method of claim 2, wherein converting the at least one page image into the at least one Blob as the at least one file object comprises:
   calling, from a webpage drawing method, a method for converting pictures into Blobs, to convert the at least one page image into the at least one Blob as the at least one file object.

4. The method of claim 1, wherein obtaining the at least one page image of the current full-screen page comprises:
   determining whether at least one picture object corresponding to the current full-screen page exists in the session data of the cache of the webpage application; and
   obtaining the at least one page image of the current full-screen page, in response to the at least one picture object not existing in the session data.

5. The method of claim 4, further comprising after determining whether the at least one picture object corresponding to the current full-screen page exists in the session data of the cache of the webpage application:
   obtaining the at least one link path corresponding to the at least one picture object from the session data, in response to the at least one picture object existing in the session data, to complete the screenshot of the current full-screen page.

6. The method of claim 4, wherein determining whether the at least one picture object corresponding to the current full-screen page exists in the session data of the cache of the webpage application comprises:
   calling, according to the picture name of the at least one picture object, a method for obtaining session data, to extract the at least one picture object from the session data;
   determining that the at least one picture object exists in the session data, in response to successfully calling the method for obtaining session data; and
   determining that the at least one picture object does not exist in the session data, in response to failing to call the method for obtaining session data.

7. The method of claim 1, wherein the current full-screen page comprises at least one scene, and each of the at least one scene is an image on a different position contained in the current full-screen page;
   wherein obtaining the at least one page image of the current full-screen page comprises:
      obtaining each of the at least one scene in the current full-screen page as the at least one page image, in response to having loaded the current full-screen page.

8. The method of claim 1, wherein the current full-screen page comprises at least one scene, and each of the at least one scene is an image on a different position contained in the current full-screen page;
   wherein obtaining the at least one page image of the current full-screen page in the webpage application comprises:
      when a screenshot command is received on the current full-screen page, taking at least one to-be-captured scene specified by the screenshot command as the at least one page image, in response to the screenshot command, wherein the at least one to-be-captured scene specified by the screenshot command is contained in the at least one scene in the current full-screen page.

9. The method of claim 1, further comprising after completing the screenshot of the current full-screen page:
   in response to receiving an access request for at least one target picture object of the at least one picture object in the webpage application, obtaining, through an image source path of the at least one target picture object, at least one target file object corresponding to the at least one target picture object, a link path of the at least one target file object being the same as the image source path of the at least one target picture object; and
   loading the at least one target picture object according to the at least one target file object, to view and save the at least one target picture object.

10. The method of claim 1, wherein the current full-screen page comprises at least one scene, and each of the at least one scene is an image on a different position contained in the current full-screen page;
  wherein obtaining the at least one page image of the current full-screen page in the webpage application comprises:
    dividing the at least one scene from the current full-screen page, and setting at least one node identifier for the at least one scene, the at least one node identifier characterizing at least one data location corresponding to the at least one scene in the current full-screen page, and the at least one scene corresponding to the at least one node identifier one-to-one;
    obtaining at least one target node identifier corresponding to at least one to-be-captured scene in the current full-screen page, the at least one to-be-captured scene being a target screenshot scene in the at least one scene;
    reading, according to each of the at least one target node identifier, content data corresponding to each of the at least one target node identifier from content data of the current full-screen page, to obtain at least one target page data; and
    generating, through a webpage rendering function, the at least one page image according to the at least one target page data.

11. The method of claim 1, wherein saving the picture name and the image source path of the at least one picture object into the session data of the cache of the webpage application comprises:
  calling a method for setting session data, to save the picture name and image source path of the at least one picture object into the cache of the webpage application.

12. An image processing apparatus, comprising:
  a memory for storing instructions; and
  a processor for executing the instructions to perform operations of:
    obtaining at least one page image of a current full-screen page in a webpage application;
    converting the at least one page image into at least one file object, and creating at least one link path of the at least one file object, the at least one file object corresponding to the at least one link path one-to-one; and
    creating at least one picture object, and associatively saving the at least one picture object and the at least one link path in a cache of the webpage application, to complete screenshot of the current full-screen page;
    wherein creating the at least one picture object, and associatively saving the at least one picture object and the at least one link path in the cache of the webpage application, to complete the screenshot of the current full-screen page comprises:
      calling, from a script of the webpage application, a method for creating a picture object, to create the at least one picture object;
      taking each of the at least one link path as an image source path of each of the picture object, and saving the at least one picture object into the cache of the webpage application, the image source path being a path for obtaining content data when each of the picture object is loaded; and
      saving a picture name and image source path of the at least one picture object into session data of the cache of the webpage application, to associatively save the at least one picture object and the at least one link path through the session data, so as to complete the screenshot of the current full-screen page.

13. The image processing apparatus of claim 12, wherein converting the at least one page image into the at least one file object, and creating the at least one link path of the at least one file object comprises:
  converting the at least one page image into at least one binary large object (Blob) as the at least one file object; and
  calling, from the script of the webpage application, a method for creating an object location path, to create a resource address of each of the at least one Blob as a link path, to obtain the at least one link path.

14. The image processing apparatus of claim 12, wherein obtaining the at least one page image of the current full-screen page comprises:
  determining whether at least one picture object corresponding to the current full-screen page exists in the session data of the cache of the webpage application; and
  obtaining the at least one page image of the current full-screen page, in response to the at least one picture object not existing in the session data.

15. The image processing apparatus of claim 14, wherein the processor is further configured to execute the instructions to perform an operation of:
  after determining whether the at least one picture object corresponding to the current full-screen page exists in the session data of the cache of the webpage application, obtaining the at least one link path corresponding to the at least one picture object from the session data, in response to the at least one picture object existing in the session data, to complete the screenshot of the current full-screen page.

16. The image processing apparatus of claim 12, wherein obtaining the at least one page image of the current full-screen page comprises:
  obtaining an image corresponding to each scene in the current full-screen page as the at least one page image, in response to having loaded the current full-screen page.

17. The image processing apparatus of claim 12, wherein obtaining the at least one page image of the current full-screen page in the webpage application comprises:
  when a screenshot command is received on the current full-screen page, taking an image corresponding to at least one to-be-captured scene specified by the screenshot command as the at least one page image, in response to the screenshot command.

18. A non-transitory computer-readable storage medium, having stored thereon one or more computer programs, the one or more computer programs executable by one or more processors to achieve an image processing method, comprising:
  obtaining at least one page image of a current full-screen page in a webpage application;
  converting the at least one page image into at least one file object, and creating at least one link path of the at least one file object, the at least one file object corresponding to the at least one link path one-to-one; and
  creating at least one picture object, and associatively saving the at least one picture object and the at least one link path in a cache of the webpage application, to complete screenshot of the current full-screen page;

wherein creating the at least one picture object, and associatively saving the at least one picture object and the at least one link path in the cache of the webpage application, to complete the screenshot of the current full-screen page comprises:

calling, from a script of the webpage application, a method for creating a picture object, to create the at least one picture object;

taking each of the at least one link path as an image source path of each of the picture object, and saving the at least one picture object into the cache of the webpage application, the image source path being a path for obtaining content data when each of the picture object is loaded; and saving a picture name and image source path of the at least one picture object into session data of the cache of the webpage application, to associatively save the at least one picture object and the at least one link path through the session data, so as to complete the screenshot of the current full-screen page.

\* \* \* \* \*